United States Patent
Ruggiero et al.

(10) Patent No.: US 6,546,149 B1
(45) Date of Patent: Apr. 8, 2003

(54) DIGITAL NOISE REDUCTION THROUGH SELECTIVE PIXEL COMPARISON

(75) Inventors: Carl J. Ruggiero, Sherwood, OR (US); Alan Lasneski, Turner, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 09/418,415

(22) Filed: Oct. 15, 1999

(51) Int. Cl.[7] .................................................. G06K 9/40
(52) U.S. Cl. ........................ 382/275; 382/172; 382/270
(58) Field of Search ................................. 382/172, 270, 382/275; 348/241, 607; 386/114; 375/240

(56) References Cited

U.S. PATENT DOCUMENTS

| | | | |
|---|---|---|---|
| 5,519,790 A | 5/1996 | Manning | 382/236 |
| 5,541,646 A | 7/1996 | Huang | 348/177 |
| 5,606,373 A | 2/1997 | Dopp et al. | 348/459 |
| 5,754,700 A | 5/1998 | Kuzma | 382/236 |
| 5,767,916 A | 6/1998 | West | 348/537 |
| 5,850,257 A * | 12/1998 | Sakata | 348/241 |
| 5,887,080 A * | 3/1999 | Tsubusaki et al. | 382/172 |
| 6,014,183 A | 1/2000 | Hoang | 348/702 |
| 6,055,018 A | 4/2000 | Swan | 348/448 |
| 6,104,831 A | 8/2000 | Ruland | 382/173 |
| 6,111,981 A * | 8/2000 | Tsubusaki et al. | 382/172 |
| 6,157,412 A | 12/2000 | Westerman et al. | 348/558 |
| 6,343,097 B2 * | 1/2002 | Kobayashi et al. | 375/240 |

* cited by examiner

*Primary Examiner*—Anh Hong Do
(74) *Attorney, Agent, or Firm*—Stoel Rives LLP

(57) ABSTRACT

A method of reducing noise in a digitally sampled image is achieved in which an entire frame image is divided into regions which are used to determine the relative noise level of the static image over a period of several frames. The relative noise level is taken as a measurement and is then used by the firmware to make adjustments during the digital sampling process. By using less than the entire frame of the image information the method of reducing noise can be implemented without requiring the presence of a frame buffer.

7 Claims, 3 Drawing Sheets

DIGITAL NOISE REDUCTION THROUGH SELECTIVE PIXEL COMPARISON

TECHNICAL FIELD

This invention is directed to reducing noise in the conversion of an analog signal to a digital video signal and, in particular, by using a subset of a total image to determine the noise level of a static image over a period of time.

BACKGROUND OF THE INVENTION

It has become increasingly popular to use multimedia display systems to make presentations at business meetings, sales demonstrations, and classroom sessions. Most multimedia projection display systems receive analog video signals from a personal computer (PC). The video signals represent still, partial-, or full-motion display images of the type rendered by the PC. The analog video signals are converted into digital video signals to control a digitally-driven display object, such as a transmissive liquid crystal display (LCD) or a digital mirror device (DMD), to form the display images for projection onto a display screen.

Two common types of multimedia projection display systems are LCD projectors and LCD projection panels. An LCD projector includes a transmissive LCD, a light source, and projection optics to form ad project display images in the manner described above. An LCD projection panel includes a similar transmissive LCD to form the display image, but operates with a conventional overhead projector (OHP) having a light source and projection optics, to project the display image onto a display screen. Examples of such LCD projectors and LCD projection panels are sold under the respective trademarks LITEPRO and PANELBOOK by In Focus Systems, Inc. of Wilsonville, Oreg., the assignee of the present invention.

One desirable feature for multimedia display systems is compatibility with the various analog video signal modes generated by various PC's. These modes generally range from 640×480 to 1600×1200 resolutions provided at image refresh rates of 60 to 100 Hz. The resolution expresses the number of horizontal and vertical pixel elements that can be turned on and off. Given the variety of resolution modes, multimedia display systems include an interface that converts analog video signals of various modes to digital video signals capable of controlling the LCD.

Analog video signals comprise an analog image data signal for each of the primary colors red, green and blue, and digital timing signals, which may include a pulsed horizontal synchronizing signal (Hsync) and a pulsed vertical synchronizing signal (Vsync), or a composite sync signal. The individual analog color signals are generated from bit data in a memory portion of the PC, using three digital-to-analog (D/A) converters, one for each of red, green, and blue. A complete image is typically displayed during a time interval known as a "frame period." Each video frame is usually produced to have a central active video region surrounded by an inactive ("blanked") margin. The resolution refers to only the pixels in the active video region. The state of each pixel, it's color or shade of gray, for example, is described by several bits of data. The exact number of bits depends upon the desired number of colors or gray levels. Because of the large number of pixels and multiple bits required to specify the optical state of each pixel, a large amount of image data is required to characterize the image of each frame. For example, a typical liquid crystal display may have 480 rows and 640 columns that intersect to form a matrix of 307,200 pixels.

Because the LCD used in multimedia display systems require digital video signals, either the LCD or the system normally has an analog to digital (A/D) signal converter for converting the PC-generated analog video signals into a digital format suitable for driving the LCD. The A/D signal converter is usually combined with a phase-locked loop (PLL), which may comprise a phase comparator, a low-pass loop filter, and a voltage-controlled oscillator (VCO) formed in a loop to generate a feedback signal that locks into Hsync. In order to generate a selected multiple n of clock pulses for each period of Hsync, a divide-by-n counter is added to the feedback loop between the VCO output and the phase comparator.

The number n of individual pixel pulses per Hsync pulse may be set by reference to the resolution mode of the analog video source. To set the resolution mode, certain characteristics of the analog video signal, such as Hsync and Vsync may be used to refer to a mode look-up table stored in the display system CPU. The number n should be set to equal the number of pixel data components in each horizontal line of the scanned analog signal, including those active video data region and the blanked margin regions on either side of the active region. For example, for a screen resolution of 640×480, n may be set at about 800 to include the blanked regions on either side of the 640 pixel-wide active video data region. Thus, the pixel clock would sample the continuous stream of analog image data 800 times along each horizontal line of the frame.

FIG. 1 shows the desired relationship between the analog video data signal 1 and the pixel clock signal 4 is that the number n of pixel clocks 5 is set to establish a one-to-one relationship between pixel clock pulses 5 and pixel data components 2 of the analog data signal 1. This one-to-one relationship requires that the pixel clock signal frequency be equal to the analog video data signal frequency. Under this relationship, each pixel data component 2 of the analog signal is sampled by a single pixel clock pulse 5, which reads the instantaneous voltage value of the pixel data component so that it can be digitized. Since the pixel clock pulses 5 have "jitter" zones 6 at their leading and trailing edges, the clock pulses 5 should be registered with the centers of the pixel data components 2, so that the sampling is not randomly pushed by the jitter into the transition regions of the analog video signal. The stream of digitized values form the digital video data signal, which is addressed to the display object to appropriately set display object pixels at blank (black) or selected activated (non-black) status to replicate the image defined by the analog video signal.

Unfortunately, such A/D conversion is often imperfect due to errors in the pixel clock sampling of the analog signal. Such sampling imprecision gives rise to frequency (also known as "tracking") and "phase" errors, both of which may degrade the quality of the image.

Referring to the analog video signal 1 and pixel clock signal 4' in FIG. 2, tracking error results from the number n of pixel clocks being improperly set. As discussed above, the number n of pixel clocks should be equal to the number of pixel data components 2 of each horizontal line of analog video data signal. In FIG. 2, the improper setting of n results in the pixel data components 2 not being sampled at a consistent point. For instance, n is set too large in clock signal 4'. The resulting crowding of the pixel clock pulses 5' yields an additive leftward drift of the pixel clock pulses 5' relative to the pixel clock data components 2 of the analog video data signal 1. Such drift causes sampling in the transition regions 3. For instance, as indicated by positional bracket A, the leading edges 7' of the third through the sixth clock pulses 5' sample in transition zones 3 of the analog video signal 1.

Accordingly, the transition zone data will be erroneous and the image information from adjacent non-sampled pixel data components 2 will be missing from the digitized video signal. If n is erroneously set large enough, the pixel clock pulses may be so crowded that individual analog pixel data components 2 may be double-sampled. On the other hand, if n is set too small, the dispersion of the pixel clock pulses results in a rightward drift wherein sampling may also occur in the transition regions. In all of these cases, the erroneous sampling provides erroneous video signal data that may degrade the image quality.

Phase error may occur even if the pixel clock signal frequency equals the analog vidoe data signal frequency. As shown in pixel clock signal 4" in FIG. 3, the clock phase may be erroneously set such that every pixel clock pulse samples a transition region 3 of the analog video data signal. Leading edge jitter makes such phase error more likely, since if the jitter zones straddle the intersections 8 of the pixel data components 2 and transition regions 3 of the analog video data signal 1, the voltage will be randomly sampled on either side of the intersection 8. In any case, phase error is undesirable in generating undesirable noise, or "snow" in the video image.

A current system for a projection display system is connected to a multimedia source of the PC type. The projection display system may include an image capture circuit that automatically eliminates phase and tracking error. A microcontroller, which is part of a display system CPU, controls the image capture circuit. The image capture circuit includes a programmable delay device, a PLL, a divide-by-n-counter, an A/D converter, and an ASIC (Application Specific Integrated Circuit) that contains an image edge detection circuit. The microcontroller controls the delay device and the counter to eliminate phase and tracking errors. A display object is connected to the output of the A/D converter. A window random access memory (WRAM) is connected between the ASIC and the display object.

The A/D converter samples (reads) the instantaneous voltage value of the analog video data signal at the leading edge of each of the pixel clocks, thereby generating a series of sampled data signal values. The A/D converter then quantizes the sampled values by matching each value to one of a series of preselected voltage amplitude levels, which have corresponding numerical values. These numerical values are then represented digitally and coded to establish 8-bit data for each of the colors red, green and blue. The three eight-bit color data signals are input through the three respective color data signal channels to the ASIC. At the display object, the coded color data signal set pixels at blank (black) or specific activated (non-black) status corresponding to the sampled voltage level.

The digital video data signals output from the image capture circuit are manipulated by the WRAM and display object control module to appropriately control the display object. Each frame is addressed to the WRAM where the frames are stored until they are addressed to the display object. Typically, the frames are addressed to the WRAM at a faster rate than they are addressed to the display object. For example, each frame may be addressed to the WRAM at 80 Hz and addressed to the display object at 60 Hz. Therefore, the WRAM must include enough capacity or memory to store a number of (how many, typically) frames at once.

Such current systems are not optimum due to the fact that every pixel of each frame must be held within the WRAM for comparison with pixels of consecutive frames. The WRAM is expensive and adds to the cost of the projection system because of its necessary large storage capacity. Additionally, the WRAM takes up a large amount of board space.

SUMMARY OF THE INVENTION

It is an object of the present invention to reduce noise in a digitally sampled image without the use of an expensive frame memory to store the entire frame image.

Another object of the invention is to reduce noise in a digitally sampled image by using a subset of the total image information to compute the relative noise level of a static image over a time period of several frames.

A further object of the invention is to select at least one line from each region of the frame to compare with corresponding lines in a consecutive frame and storing the lines in a memory array or line buffers.

In accordance with a preferred method of the present invention, a digital video signal is produced from an analog video signal including an analog video data signal that is operable to be raster scanned in lines across a CRT screen to form consecutive frames of video information. The raster scanning is controlled by use of a horizontal synchronizing signal (Hsync) that controls a line scan rate and a vertical synchronizing signal (Vsync) that controls a frame refresh rate to produce consecutive frames of video information. The digital video signal is produced by generating a pixel clock signal with pixel clocks for repetitively sampling instantaneous values of the analog video data signal and digitizing the active image width of the analog video data signal based on the pixel clock sampling.

The entire frame image is divided into different regions. Each region can be programmed to various sizes. The pixels within selected lines of each region are then used to determine the relative noise level of the static image. This is done over a time period of two frames where every line within each region is scanned to determine which line in each region has the highest frequency count. High frequency count is defined as pixels whose first derivative is greater than a specified threshold (i.e. the line having the most transitions from low to high data values). The highest frequency lines within each region are stored in a memory array or line buffers. These high frequency lines are compared to corresponding lines in consecutive frames of data to determine the relative noise data. The relative noise level is taken as a measurement and is then used by the firmware to make adjustments during the digital sampling process. Through multiple iterations of measurement and adjustment the image can be made to be virtually free of noise. By using less than the entire frame of image information the method of reducing noise can be implemented without requiring the presence of a frame buffer.

In accordance to other aspects of the present invention, apparatus are provided for carrying out the above and other methods.

Additional objects and advantages of this invention will be apparent from the following detailed description of preferred embodiments thereof which proceeds with reference to the accompanying drawings.

DETAILED DESCRIPTION OF PREFERRED EMBODIMENT

Figure 1:
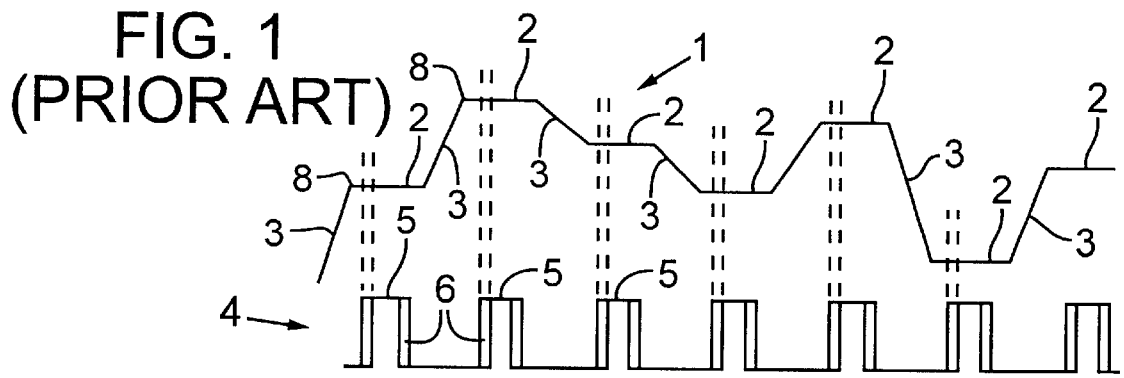
FIG. 1 depicts an analog video data signal waveform and a pixel clock signal waveform in a desired relationship where no tracking or phase error would result.
Figure 2:
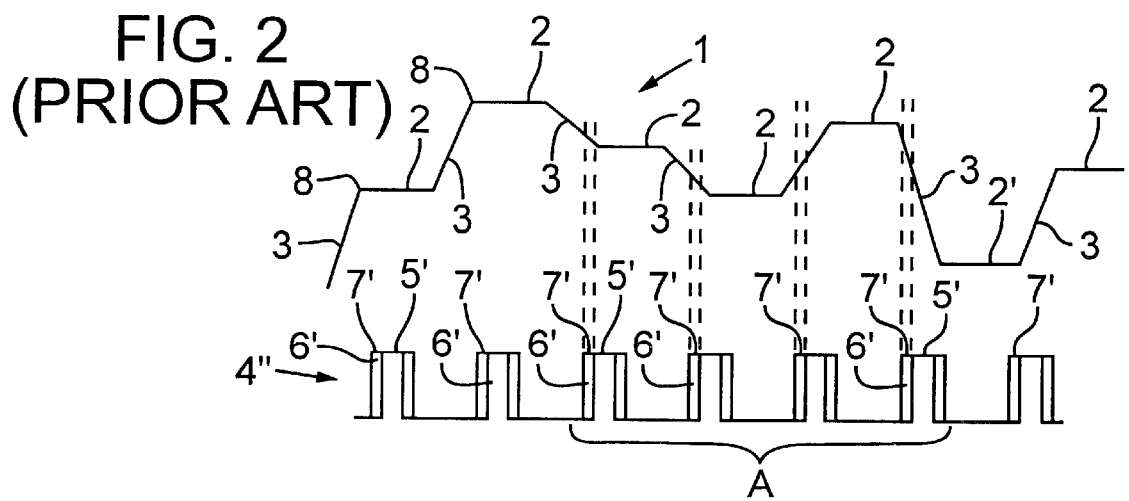
FIG. 2 depicts an analog video data signal waveform and a pixel clock signal waveform in a relationship where tracking error would result.
Figure 3:
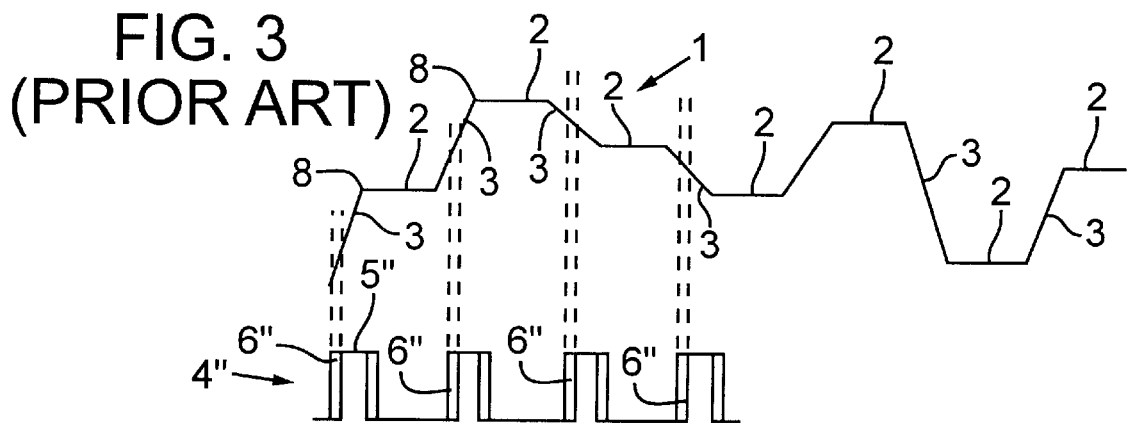
FIG. 3 depicts an analog video data signal waveform and a pixel clock signal waveform in a relationship where phase error would result.
Figure 4:
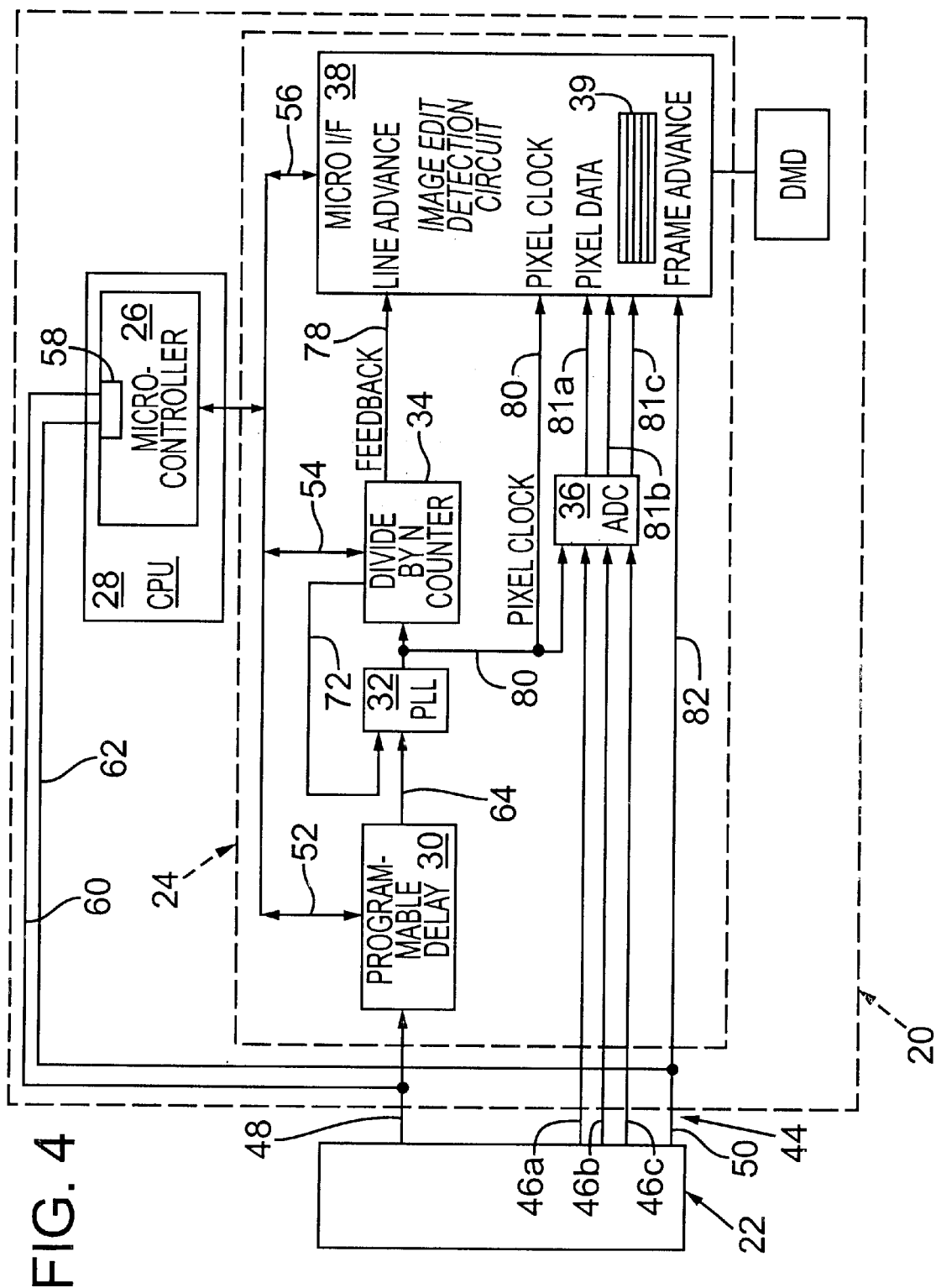
FIG. 4 is an overall schematic view of multimedia source connected to a multimedia projection display system, and depicting an analog video signal capture circuit in accordance with an aspect of the invention.

A schematic illustration of the present invention is seen in FIG. 4 which shows a projection display system 20 connected to a multimedia source 22 such as a PC. The projection display system 20 includes an image capture circuit 24 that automatically eliminates phase and tracking error. A microcontroller 26, which is part of a display system CPU 28, controls the image capture circuit 24. The image capture circuit 24 includes a programmable delay device 30, a PLL 32, a divide-by-n-counter (counter) 34, an A/D converter 36, and an ASIC (Application Specific Integrated Circuit) 38. The ASIC 38 may contain a pixel data comparator, a counter, a threshold value register, various registers (not shown) and a memory array of line buffer 39 to perform the algorithm discussed below. The microcontroller 26 executes a firmware program that runs the ASIC 38 and controls the delay device 30 and the counter 34 based on the output of the ASIC 38 to eliminate phase and tracking errors. A display object 42, preferably a DMD, is connected to the output of the A/D converter 36.

The multimedia source PC 22 is connected to the projection display system 20 through a video source cable 44 shown in exploded schematic form. The cable 44 is of conventional design and includes multiple distinct conductors that are shielded together, including three separate channels 46a, 46b, 46c for carrying analog signals corresponding to red, green, and blue (RGB) color video components, and two conductors 48, 50 carrying the Hsync and Vsync signals, respectively.

Turning to the details of the image capture circuit 24, the microcontroller 26 is connected to the delay device 30 by a bus 52, to the counter 34 by a bus 54, and to the ASIC 38 by a bus 56. A mode identification counter 58, which is connected to Hsync and Vsync through conductors 60 and 62, respectively, may be located in the microcontroller 26 or the ASIC 38. The mode identification counter 58 may also be provided independent of the microcontroller. A preferred microcontroller 26 is model MC6833 1, made by Motorola. The delay device 30 has an input connected to the Hsync conductor 60, and an output connected to the PLL 32 through conductor 64. The preferred delay device is model No. DS10205-25, made by the Dallas Corporation.

Figure 5:
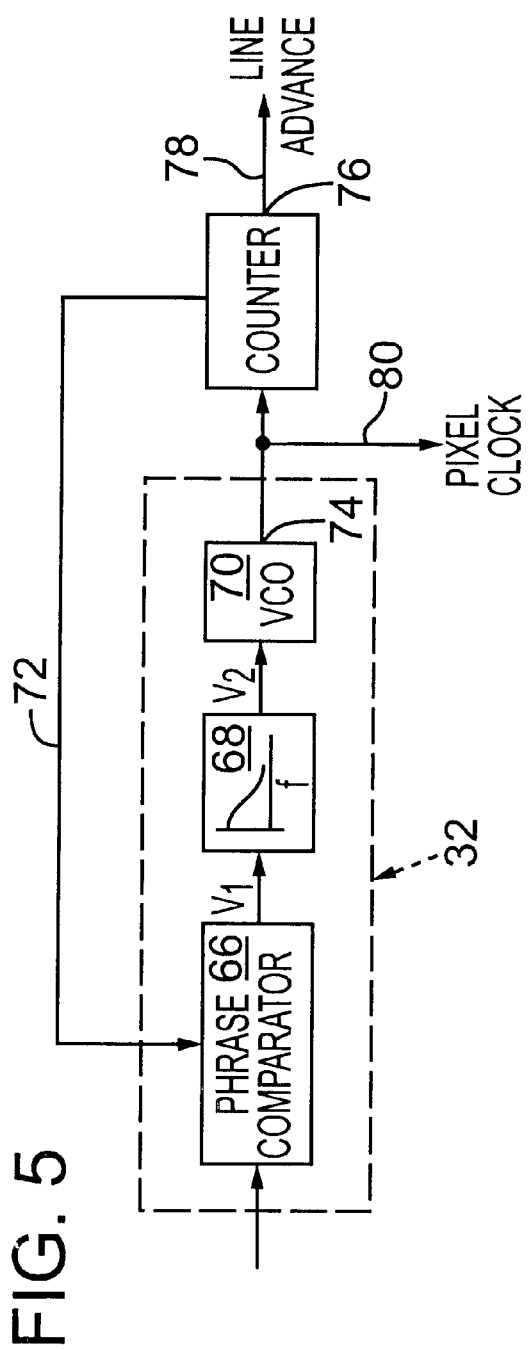
FIG. 5 is a schematic view of a phase-locked-loop (PLL) circuit used in analog video signal capture according to an aspect of the present invention.

As shown in detail in FIG. 5, the PLL 32 is of conventional design and includes a phase comparator 66, a low-pass filter 68, and a VCO pixel clock signal generator 70. A feedback loop 72 provided with the counter 34 connects the VCO output 74 and the phase comparator 66. The counter output 76 is connected to the ASIC 38 through a conductor 78, and the VCO output 74 is connected to the ASIC 38 and the A/D converter 36 through conductor 80. The preferred PLL is model ICS 1522 made by ICS. The counter 34 is preferably a part of the ASIC 38.

Referring now to FIGS. 4, the three analog video data signal channels 46a, 46b, 46c are connected to the A/D converter input. The A/D converter 36 includes three separate conventional A/D converters for digitizing each of the red, green and blue analog video data signals. Three color data signal channels 81a, 81b, 81c connect the A/D converter output to the ASIC. A preferred A/D converter is model 9542A made by the Raytheon Corporation. The Vsync signal output of the PC source 22 is connected to the ASIC 38 through a frame advance conductor 82.

In operation, the analog video signal is digitized in a manner set forth and described in U.S. Pat. No. 5,767,916. The display system 20 determines the resolution mode by a firmware program that uses the mode identification counter 58.

Hsync is input through conductor 60 to the mode identification counter 58 and the number of 50 MHz counter clocks over twenty Hsync pulses is counted. In this way, an average number of clocks per line is obtained. Vsync is input through conductor 62 into the mode identification counter 58 and the number of lines for each Vsync pulse is obtained. The firmware then accesses a look-up table that determines resolution based on the number of 50 MHz clocks per twenty lines, and number of lines per frame.

Digitization of the analog video data signals occurs based on the number n of pixel clocks per line. The PLL 32 generates the pixel clock signal and the microcontroller 26 sets the counter 34 to generate a feedback pulse (i.e. line advance signal) once every n pixel clocks. Once n is selected, the PLL 32 automatically adjusts to produce a line advance signal frequency corresponding to Hsync, and a pixel clock signal having a frequency of n times the line advance frequency.

The PLL 32 works by the phase comparator 66 receiving the Hsync signal from the delay device 30 through conductor 64 and receiving the feedback pulse signal through the feedback loop 72. The phase comparator 66 compares the frequencies of the Hsync and the feedback pulse signal, generating an output voltage that is a measure of their phase difference. If the feedback pulse frequency does not equal the Hsync frequency, the phase difference signal causes the VCO pixel clock frequency to deviate so that the feedback pulse frequency of the counter 34 deviates toward the Hsync frequency.

The feedback pulse signal (line advance signal) of the counter 34 is directed to the ASIC 38 and the A/D converter 36 through conductor 80. The line advance signal and Vsync are conditioned to be one clock pulse in duration through the use of a pulse edge detection circuit or the like.

The A/D converter 36 samples (reads) the instantaneous voltage value of the analog video data signal at the leading edge of each of the pixel clocks thereby generating a series of sampled data signal values. The A/D converter then quantifies the sampled values by matching each value to one of a series of preselected voltage amplitude levels, which have corresponding numerical values. These numerical values are then represented digitally and coded to establish 8-bit data for each of the colors red, green, and blue. The three eight-bit color data signals are input through the three respective color data signal channels 56a, 56b, 56c to the edge detection circuit 40. At the DMD, the coded color data signal set pixels at blank (black) or specific activated (non-black) status corresponding to the sampled voltage value.

Figure 6:
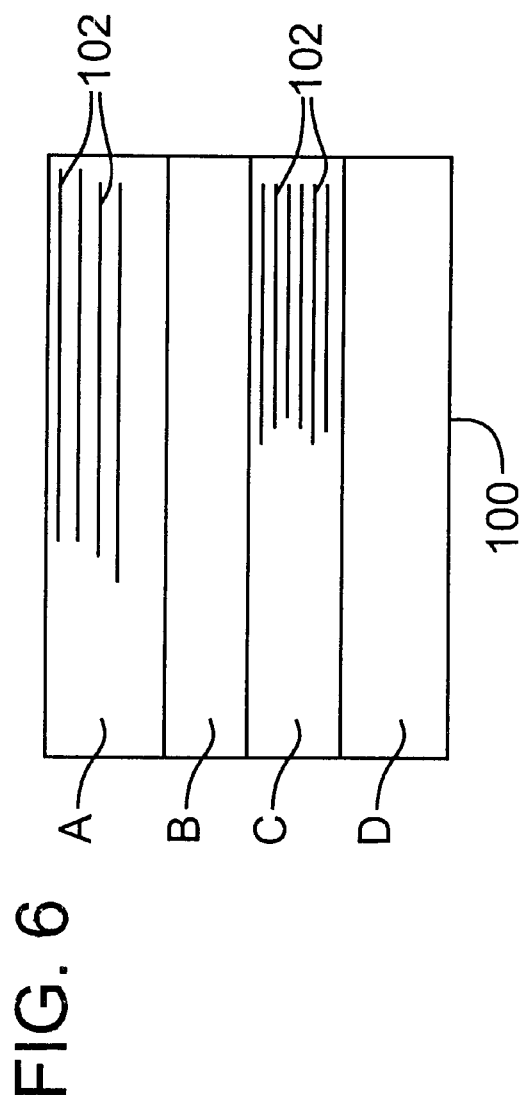
FIG. 6 is a schematic view of a frame of data divided into regions.

The entire frame image is programmed by the firmware into different regions with each region having a variable number of lines. For example, as seen in FIG. 6 the entire image of a first frame 100 (Vsync 1) may be divided into four regions A, B, C, D with each region having a number of lines 102 of pixel components. The ASIC 38 scans every line within each region to determine which line within each region has the highest transition or the highest number of pixels whose input value is equal to or greater than a selected high frequency threshold determined by the firmware. The highest frequency line for region A is then held in the memory array. This process is repeated for each of the other regions B, C, and D to determine the highest frequency line within each region. The highest frequency line for each region is then representative of its associated region and is stored within the memory array by a second frame (Vsync 2) such that the pixels within these same lines are compared with the same lines of the next frame.

A third frame compares the pixels in the stored lines with corresponding lines of the current frame. A pixel value subtraction is performed by the ASIC 38 in which the value of each red, green, and blue for each pixel of the stored lines is subtracted from the corresponding pixel values for the next consecutive frame. If the difference between these two values is equal to or greater than a firmware pixel comparison threshold value then it is determined to be a miscount and a counter within the ASIC 38 is incremented by one. The pixel clock phase is shifted over the sample region of the analog signal. This is repeated for the entire line for each region. The counter represents the miscount for each line. The total miscount is stored in registers within the ASIC 38.

The process of capturing the high frequency lines within each region, comparing the lines to corresponding lines in the next frame, performing the pixel value subtraction, and shifting the pixel clock phase is performed a number of times as determined by the firmware. For example, it has been determined that twenty steps are adequate. The pixel clock phase is then set to that step having the lowest miscount and the algorithm is complete.

It will be obvious to those having skill in the art that many changes may be made to the details of the above-described embodiment of this invention without departing from the underlying principles thereof. The scope of the present invention should, therefore, be determined only by the following claims.

What is claimed is:

1. A method of reducing noise in a conversion of an analog video signal to a digital video signal for display on a digital display object having pixels arranged in lines and columns, the analog video signal including an analog video data signal generated to produce frames of digital video data with each frame including a plurality of lines of pixel components, the method comprising the steps of:

dividing a first frame of digital video data into different regions each including at least one line of the pixel components;

generating a pixel clock signal having a pixel clock phase for sampling every line in each region to determine a line within each region having a highest number of pixel components;

storing the highest number lines of each region;

changing the pixel clock phase;

producing a second frame of digital video data and comparing corresponding lines of pixel components within the second frame with the highest number lines of the first frame to determine whether the highest number is different between the first and second frames and represents a miscount;

repeating the above steps a number of times for subsequent frames of digital video data; and adjusting the pixel clock phase to correspond to the pixel clock phase of the frame of digital video data having the lowest miscount.

2. The method of claim 1, in which the first, second, and subsequent frames of digital video data are consecutive frames.

3. The method of claim 1, wherein the frame of analog video data is divided into four regions.

4. The method of claim 1, wherein the selected lines within each region are stored in a memory array.

5. The method of claim 1, wherein the selected lines are chosen based on the number of pixel components having a value greater than a predetermined pixel value threshold.

6. The method of claim 4, wherein the step of determining a total number of pixel components in the selected lines of each frame entails comparing the selected lines stored in the memory array with corresponding lines of a consecutive frame.

7. The method of claim 1, in which the digital video signal carries a static image over a period of several frames.

* * * * *